July 10, 1951  J. J. LANGE ET AL  2,559,975
WHEEL
Filed June 21, 1946  2 Sheets-Sheet 1
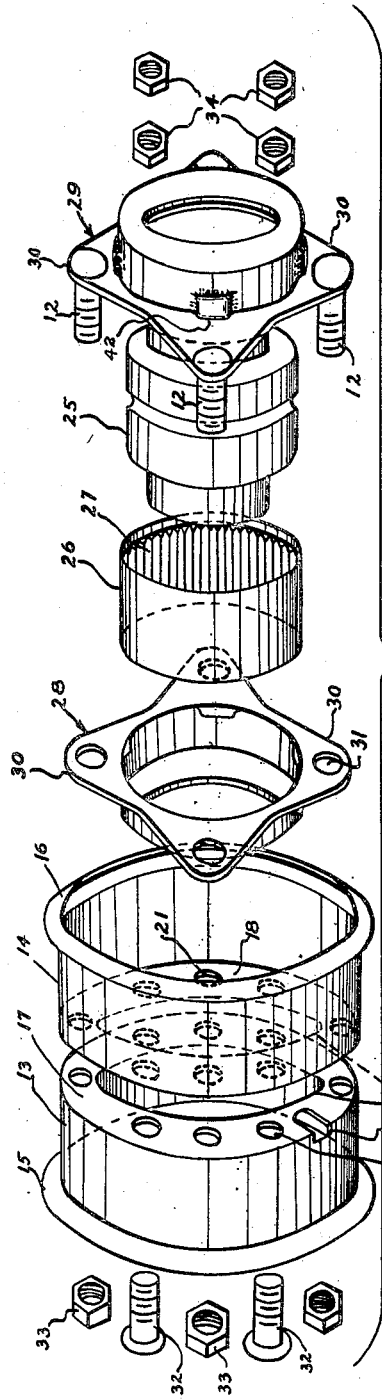
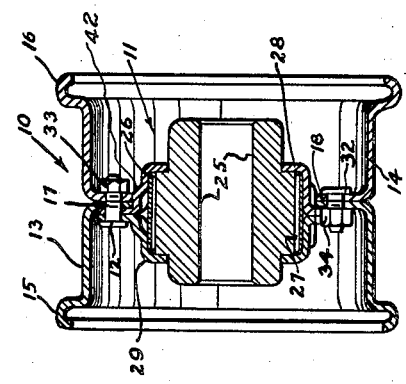
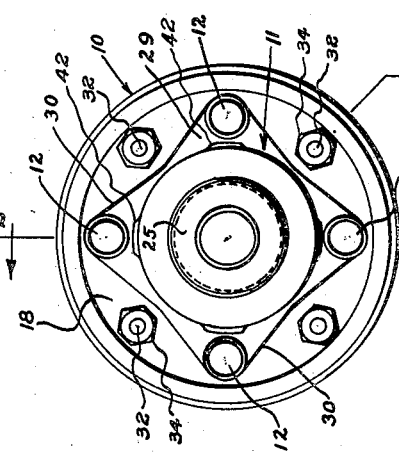
INVENTORS.
JOHN J. LANGE
BY ALGER G. MARANVILLE July 10, 1951     J. J. LANGE ET AL     2,559,975
WHEEL
Filed June 21, 1946     2 Sheets-Sheet 2

INVENTORS.
JOHN J. LANGE
ALGER G. MARANVILLE
BY Fay, Holrich, & Fay,
Attorneys.

Patented July 10, 1951

2,559,975

UNITED STATES PATENT OFFICE 2,559,975

WHEEL

John J. Lange, Cuyahoga Falls, and Alger G. Maranville, Akron, Ohio, assignors to The Falls Stamping & Welding Company, Cuyahoga Falls, Ohio, a corporation of Ohio Application June 21, 1946, Serial No. 678,384

5 Claims. (Cl. 301—63)

This invention relates to wheels and is especially directed to wheels of the type suitable for use on industrial trucks which are demountable with respect to the vehicle as well as with regard to pneumatic tires which may be readily disposed thereon.

It is the primary purpose of this invention to provide a wheel of the type described which may be formed from metal forgings and stampings thus to derive a strength of elements and simplicity of construction not heretofore obtained.

It is a further object to provide wheels of the type described in which anti-friction bearings of simple yet durable construction may be employed and so disposed in relation to the wheel assembly as to be readily serviced or replaced as the exigencies of service require.

A further object of the present invention is to provide a wheel structure comprising two complementary drawn sheet steel elements formed to constitute the radial and rim portions of a demountable pneumatic rim which can be removed readily from a stamped hub bearing structure so devised as to remain in bearing retaining relation to a bearing hub fixed to the axle of the vehicle.

Other objects and advantages will become apparent hereinafter when the specification is read in conjunction with the accompanying drawings in which:

Fig. 1 is a side elevational view of one embodiment of the present invention showing the wheel as assembled without a pneumatic tire;

Fig. 2 is a cross sectional elevational view taken along the broken line 2—2 of Fig. 1;

Fig. 3 is an exploded view showing the number and relationship of parts entering into a preferred embodiment of this invention;

Figure 8:
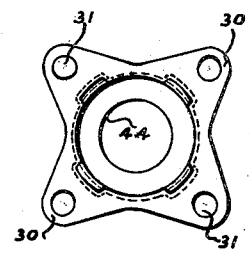
Figure 5:
Figure 13:
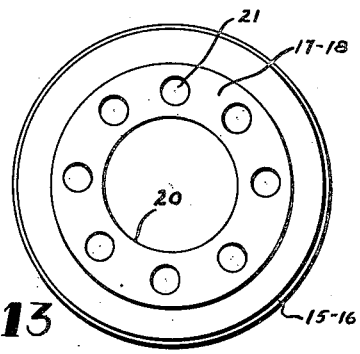
Figure 14:
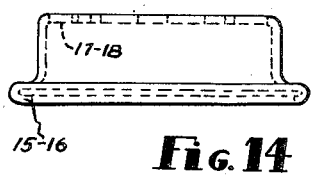

Figs. 4 and 5, and 6 and 7 are plan and side views, respectively, of a blank from which the hub elements are formed, as shown, and Fig. 8 is a plan view of such a completed element;

Figs. 9 and 10, and 11 and 12 are similar views of the blanking of flat stock for the formation of the rim sections, while Figs. 13 and 14 are plan and side views, respectively, of a completed rim section.

Referring now more particularly to the drawings, in which like reference characters refer to like parts throughout, the wheel body is comprised of a rim assembly 10 and a hub assembly 11 which are joined together by fastenings 12 of any suitable form but preferably of the threaded type for easy demountability.

The rim assembly 10 is composed of two cup-like elements 13 and 14 which are provided with rolled flanges 15 and 16, respectively, and radial web portions 17 and 18.

The web portions of the cup-like elements are provided with a large central aperture or opening 20 for the accommodation of the hub assembly and a plurality of smaller openings 21 circumjacent thereto for the accommodation of fastenings to secure the assembly together. In the lower portion of one of the cup-like elements, disposed so as to penetrate both the web and the wall portion thereof, is an opening 22 provided for the reception of a valve stem of a pneumatic tire or the like (not shown).

The hub and bearing assembly is comprised of a relatively revoluble journal member 25 which is shaped to have a bearing surface disposed within a roller bearing sleeve 26. The journal member 25 in practice is secured to the axle of the vehicle by any suitable means, not shown. This hub assembly is provided with suitable roller or needle bearings 27 for the accommodation of the journal, or, instead of anti-friction bearings, may be provided with ball bearings or plain bearings of a type suited to this purpose.

The journal 25 is secured against axial displacement relative to the bearing sleeve 26 by a pair of journal half casings 28 and 29, respectively, which complement each other to form a housing for the hub assembly. The housing thus formed is provided with flanges 30 which are provided with apertures 31 for the reception of fastenings 12. The fastenings 12 pass through the apertures (and the fastenings) of the flanges 30 of the journal half-casings 28 and 29, and, thence, through the perforations 21 in the web portions of the cup-like elements of the rim assembly 10 and are made fast by nuts 33 or other suitable means.

These fastenings in number preferably occupy every other perforation in the webs of the rim assembly so that the intermediate perforations are left free to accommodate the fastenings 32 which are disposed, preferably, though not necessarily, so as to extend in an opposite direction to the fastenings 12, and to be secured on opposite sides of the webs therefrom by means of nuts 34 or other suitable means.

Figure 4:
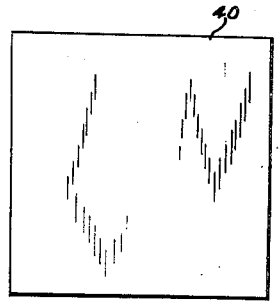
Figure 6:
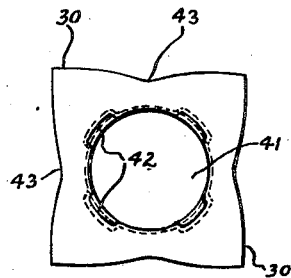
Figure 7:
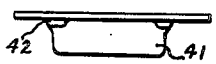

Referring now to Figs. 4 to 14, the journal half-casings are formed from pieces of square flat stock 40 which, as shown in Figs. 6 and 7, are pressed into a cup-like shape providing an offset 41. They are then preferably subjected to a coining operation to form bearing pads 42 which serve as centering lands to center the rim assembly on the hub assembly by an accurate fit with the central perforations of the rim members 13—14. It will be noticed that, incident to the drawing of the cup portion, the sides of the blanks are drawn in or trimmed off as at 43, which brings the ultimate flange portions 30 into greater definition, and provides the clearance for the intermediate web fastenings 32, described above. The semi-finished blank of Figs. 6 and 7 is then punched to provide fastening perforations 31 in the flanges 30, and a central opening 44 for the accommodation of the journal member 25.

Figure 9:
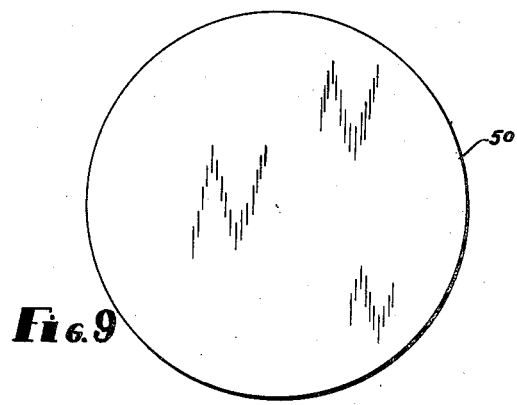
Figure 10:
Figure 11:
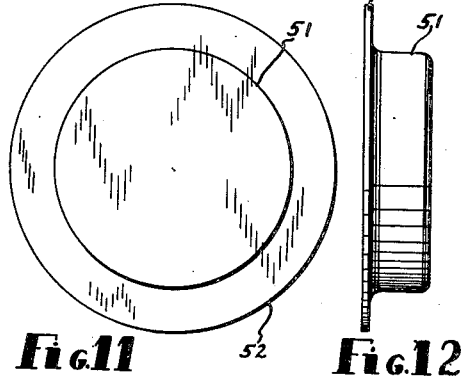
Figure 12:
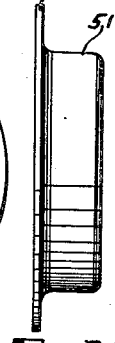

In Figs. 9 to 14 there is shown the several steps for the fabrication of the rim cup-like elements. These are preferably formed from circular blanks 50, as shown in Figs. 9 and 10, and are first drawn so as to have an offset cup-like portion 51, as indicated in Figs. 11 and 12. The rim portions 52 which are, after the drawing operation, still in flat condition are formed upwardly and inwardly to provide the rounded finished flanges 15—16, previously referred to, as is shown in Figs. 13 and 14. The cup is then stamped to provide the central hub-receiving aperture 20, and fastening perforations 21.

A wheel formed in this manner is simple, strong and exceedingly economical to produce. By presenting the hub retaining fastenings 12 and the web retaining fastenings 32 to their respective positions in opposite directions the rim assembly may be removed from the truck axle, leaving the hub in place thereon and the intermediate fastenings of the rim assembly may then be taken off to facilitate mounting and changing a tire. However, it is obvious that these fastenings may all be disposed in the same direction so as to provide access thereto from one side only without in any sense changing the nature of the construction.

The hub assembly is such as to be replaceable, for which reason the rim assembly and hub assembly are made interchangeable with similar parts made in the same manner. The hub journal 25 is free to turn on the needle bearings 27, or other suitable bearings such as may be provided, but is restrained against axial movement by the webs of the bottoms of the journal half-casings by which the entire assembly of the hub is held in firm operative engagement.

From the foregoing it is evident that changes may be made in the construction and method herein described without departing from the spirit of the present invention, which is apprehended in and by the following claims.

We claim:

1. A demountable wheel comprising a pair of flanged cup-like elements having centrally apertured and perforated radial web portions disposed back to back against one another with the flanges extending in opposite directions from the back to back portions to define a wheel rim; a hub assembly associated with the wheel rim comprising another pair of cup-like elements having perforated flange portions in engagement to define a hollow body; a bearing element contained within said hollow body; said hub assembly being mounted concentrically of the defined wheel rim and in the central apertures of the adjacent radial web portions of said wheel rim cup-like elements so as to present the hub assembly to the perforations in the radial portions of the pair of rim members for registration therewith; and fastening bolts for detachably securing all of said elements together by extending through the hub assembly flanges and the radial portions of the rim members.

2. A demountable wheel comprising a pair of flanged cup-like elements associated together to form a wheel rim; a bearing; a split housing for said bearing having flanges; said cup-like elements having a plurality of perforations for the accommodation of fastenings, said split housing flanges having perforations for alignment with some of the perforations in said cup-like elements; and a plurality of fastenings extending through the latter, some serving to hold the split-housing and cup-like elements together, others serving solely to hold said cup-like elements together.

3. A hub assembly comprising a bearing sleeve, a revoluble journal within said sleeve, a pair of cup-shaped half-casings disposed to enclose said sleeve-journal assembly to preclude relative axial displacement thereof, perforate flanges on said half-casings, a plurality of fastenings within said perforations for holding the half-casings and contained sleeve-journal assembly together and rim aligning lands formed on annular walls of the cup-shaped members.

4. A wheel assembly, comprising a hub portion and a rim portion, said hub portion including a sleeve, a revoluble journal within said sleeve, a pair of cup-shaped half-casings disposed to enclose said sleeve-journal assembly to preclude relative axial movement therebetween; perforate flanges on said half-casings; lands formed on an annular wall of one of the cup-shaped half-casings; said rim portion including complementary rim halves having opposed flanges and contiguous web portions; said web portions having registering central openings adapted to fit on the lands of one of said half-casings; a plurality of perforations in said web portions circumjacent said central openings; the flanges of said half-casings of the hub portion bearing upon the web portion of one of said rim halves with the flange perforations registering with the perforations thereof, and with the revoluble journal disposed within the central openings of the web portions thereof; and a plurality of fastenings passing through the flange and web perforations for securing the said portions together to form a wheel.

5. A demountable wheel comprising a pair of flanged cup-like elements associated together to form a wheel rim; a bearing; a split housing for said bearing having flanges; said cup-like elements having a plurality of perforations for the accommodation of fastenings, said split housing flanges having perforations for alignment with some of the perforations in said cup-like elements; a plurality of fastenings extending through the latter, some serving to hold the split-housing and cup-like elements together; others serving to hold the latter together alone; and centering lands formed on the housing for centering the rim elements upon the housing.

JOHN J. LANGE.
ALGER G. MARANVILLE.

REFERENCES CITED

The following references are of record in the file of this patent:

UNITED STATES PATENTS

| Number | Name | Date |
|---|---|---|
| 1,395,734 | Root | Nov. 1, 1921 |
| 1,580,920 | Roe | Apr. 13, 1926 |
| 2,071,080 | Marshall | Feb. 16, 1937 |
| 2,133,144 | Johnson | Oct. 11, 1938 |
| 2,187,777 | Gannett | Jan. 23, 1940 |